(12) United States Patent
Terada et al.

(10) Patent No.: US 8,354,200 B2
(45) Date of Patent: Jan. 15, 2013

(54) METHOD OF ADJUSTING FUEL DISTRIBUTION, MEMBRANE WHICH ADJUSTS FUEL DISTRIBUTION, METHOD OF PRODUCING MEMBRANE WHICH ADJUSTS FUEL DISTRIBUTION, FUEL CELL, AND METHOD OF PRODUCING FUEL CELL

(75) Inventors: Takahiro Terada, Kanagawa-ken (JP); Yasutada Nakagawa, Kanagawa-ken (JP); Yuji Sasaki, Kanagawa-ken (JP); Yuichi Yoshida, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1006 days.

(21) Appl. No.: 11/859,240

(22) Filed: Sep. 21, 2007

(65) Prior Publication Data

US 2008/0233439 A1 Sep. 25, 2008

(30) Foreign Application Priority Data

Mar. 20, 2007 (JP) ................................ 2007-073377

(51) Int. Cl.
*H01M 8/02* (2006.01)
*H01M 2/02* (2006.01)
(52) U.S. Cl. ......... 429/483; 429/428; 429/433; 429/512
(58) Field of Classification Search .................. 429/428, 429/433, 483, 512
See application file for complete search history.

(56) References Cited

U.S. PATENT DOCUMENTS

| | | | | |
|---|---|---|---|---|
| 6,740,438 | B1 * | 5/2004 | Thom | 429/436 |
| 2004/0086776 | A1 * | 5/2004 | Muthuswamy et al. | 429/44 |
| 2004/0253504 | A1 * | 12/2004 | Mossman et al. | 429/38 |

FOREIGN PATENT DOCUMENTS

| | | |
|---|---|---|
| CN | 1790790 A | 6/2006 |
| DE | 198 08 331 A1 | 9/1999 |
| DE | 198 53 911 A1 | 5/2000 |
| DE | 199 35 719 A1 | 2/2001 |
| JP | 2005-190684 | 7/2005 |
| JP | 2006-196430 | 7/2006 |
| KR | 10-2007-0014882 | 2/2007 |

OTHER PUBLICATIONS

Office Action issued Oct. 21, 2010, in German Patent Application No. 10 2007 045 284.7-45 (with English translation).

\* cited by examiner

*Primary Examiner* — Patrick Joseph Ryan
*Assistant Examiner* — Ladan Mohaddes
(74) *Attorney, Agent, or Firm* — Oblon, Spivak, McClelland, Maier & Neustadt, L.L.P.

(57) ABSTRACT

A method of adjusting a fuel distribution includes: adjusting a distribution of a fuel supply amount to a membrane electrode assembly so that a temperature distribution in the membrane electrode assembly becomes substantially uniform by a membrane provided in a fuel supply side of the membrane electrode assembly of a fuel cell. A membrane adjusts a fuel distribution, which is provided in a fuel supply side of a membrane electrode assembly of a fuel cell. The membrane is provided with openings so that a temperature distribution in the membrane electrode assembly becomes substantially uniform.

5 Claims, 10 Drawing Sheets

METHOD OF ADJUSTING FUEL DISTRIBUTION, MEMBRANE WHICH ADJUSTS FUEL DISTRIBUTION, METHOD OF PRODUCING MEMBRANE WHICH ADJUSTS FUEL DISTRIBUTION, FUEL CELL, AND METHOD OF PRODUCING FUEL CELL

CROSS-REFERENCE TO RELATED APPLICATIONS

This application is based upon and claims the benefit of priority from the prior Japanese Patent Application No. 2007-073377, filed on Mar. 20, 2007; the entire contents of which are incorporated herein by reference.

BACKGROUND OF THE INVENTION

1. Field of the Invention

This invention relates to a method of adjusting a fuel distribution, a membrane which adjusts a fuel distribution, a method of producing a membrane which adjusts a fuel distribution, a fuel cell, and a method of producing a fuel cell.

2. Background Art

With the advancement of electronics in recent years, electronic devices have become more downsized, more powerful, and more portable, requirement of downsizing and higher energy density for the cells used therein has become enhanced. Hence, middle-sized or downsized and lightweight fuel cells having high capacity has been emphasized. Direct Methanol Fuel Cell (DMFC) in which methanol serves as the fuel is more suitable for downsizing than a fuel cell using hydrogen gas because there is no difficulty in handling hydrogen gas and a device and such for producing hydrogen by reforming a liquid fuel is not required.

In the direct methanol fuel cell, a fuel electrode (anode electrode), an electrolyte membrane of solid, and an oxidant electrode (cathode electrode) are provided so as to be contiguous to one another in the order, and thereby, a membrane electrode assembly is formed. A fuel (methanol) is supplied to the fuel side and the fuel (methanol) is reacted by a catalyst in the vicinity of the electrolyte membrane to take out proton ($H^+$) and electron ($e^-$). Here, for improving electric characteristics of the fuel cell, a technique for uniformly supplying the fuel (methanol) to the fuel electrode side (see, Japanese unexamined Patent publication JP-A 2006-196430(Kokai), and German unexamined Patent publication No. 19853911).

However, in the technique disclosed in Japanese unexamined Patent publication JP-A 2006-196430(Kokai) and German unexamined Patent publication No. 19853911, a temperature distribution in the membrane electrode assembly is not considered. Therefore, the technique for uniformly supplying the fuel (methanol) to the fuel electrode side has had a problem of improvement of electric characteristics of the fuel cell, particularly, improvement of the power.

SUMMARY OF THE INVENTION

According to an aspect of the invention, there is provided a method of adjusting a fuel distribution, including: adjusting a distribution of a fuel supply amount to a membrane electrode assembly so that a temperature distribution in the membrane electrode assembly becomes substantially uniform by a membrane provided in a fuel supply side of the membrane electrode assembly of a fuel cell.

According to another aspect of the invention, there is provided a membrane which adjusts a fuel distribution, which is provided in a fuel supply side of a membrane electrode assembly of a fuel cell, the membrane being provided with openings so that a temperature distribution in the membrane electrode assembly becomes substantially uniform.

According to another aspect of the invention, there is provided a method of producing a membrane which adjusts a fuel distribution including: forming a membrane to be a base; and providing openings in the membrane so that a temperature distribution in a membrane electrode assembly of a fuel cell becomes substantially uniform when the fuel cell is operating by a fuel which is supplied through the openings.

According to another aspect of the invention, there is provided a fuel cell including: a membrane electrode assembly; and a membrane which adjusts a fuel distribution, which is provided in a fuel supply side of a membrane electrode assembly of a fuel cell, the membrane being provided with openings so that a temperature distribution in the membrane electrode assembly becomes substantially uniform.

According to another aspect of the invention, there is provided a method of producing a fuel cell which includes: a membrane electrode assembly; and a membrane which adjusts a fuel distribution, which is provided in a fuel supply side of a membrane electrode assembly of a fuel cell, the membrane being provided with openings so that a temperature distribution in the membrane electrode assembly becomes substantially uniform, including: producing the membrane by: forming a membrane to be a base; and providing openings in the membrane so that a temperature distribution in a membrane electrode assembly of a fuel cell becomes substantially uniform when the fuel cell is operating by a fuel which is supplied through the openings.

DETAILED DESCRIPTION OF THE INVENTION

Hereinafter, embodiments of this invention will be explained with reference to drawings.

Figure 1:
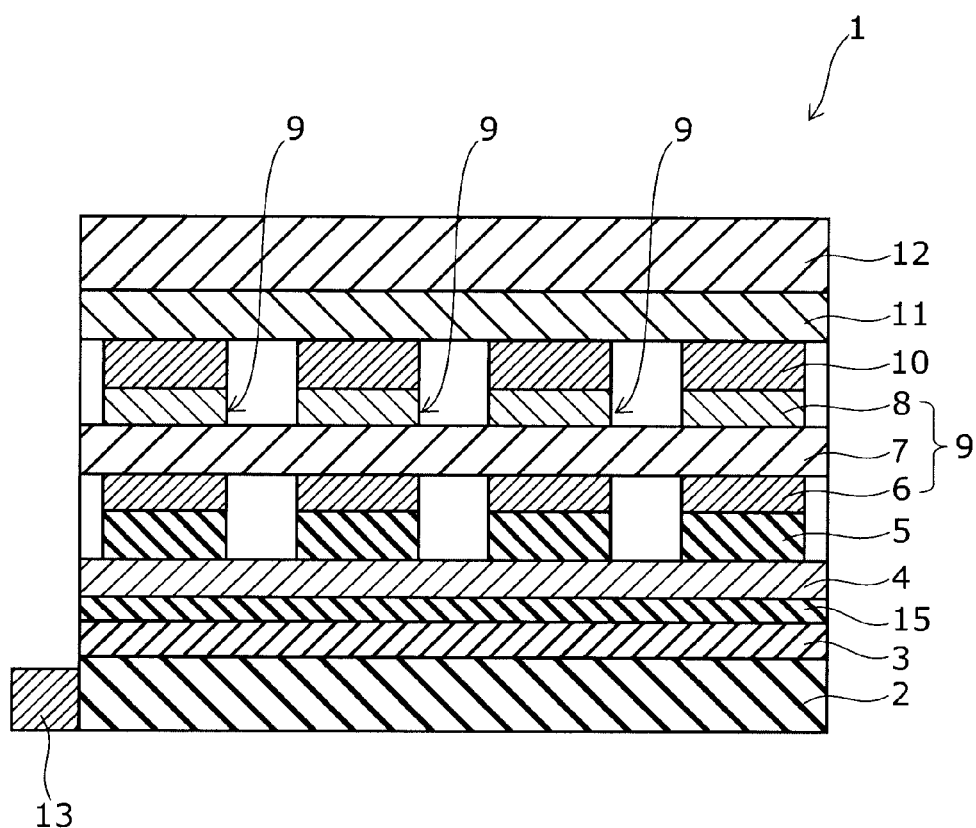
FIG. 1 is a schematic section view for explaining a fuel cell according to an embodiment of the invention.

FIG. 1 is a schematic section view for explaining a fuel cell according to an embodiment of this invention.

For convenience of explanation, the direct methanol fuel cell will be exemplified and explained.

As shown in FIG. 1, a fuel cell 1 is provided with a plurality of fuel electrodes (anode electrodes) 6 and oxidant electrode (cathode electrodes) 8 of the same number as the fuel electrodes. Moreover, an electrolyte membrane 7 is sandwiched between the fuel electrodes 6 and the oxidant electrodes 8. All of the shapes of the fuel electrodes 6, the electrolyte membrane 7, and the oxidant electrodes 8 are plate-like. And, the fuel electrode 6, the electrolyte membrane 7, and the oxidant electrode 8 are laminated in this order to form Membrane Electrode Assembly (MEA) 9, and the membrane electrode assembly 9 is an electromotive portion of the fuel cell 1. All of the membrane electrode assemblies are serially connected to one another, and the sum total of electric powers generated in the respective membrane electrode assemblies 9 is the electrode power of the fuel cell 1.

In the fuel electrode 6 and the oxidant electrode 8, catalysts for promoting the chemical response are contained, respectively. The catalysts are a simple substance metal such as Pt, Ru, Rh, Ir, Os, or Pd, which is a platinum family element, an alloy containing a platinum family element thereof, or the like. Specifically, as the catalyst contained in the fuel electrode 6, Pt—Ru, Pt—Mo, or the like having strong resistance to methanol and carbon monoxide is preferable, and as the catalyst contained in the oxidant electrode 8, Pt, Pt—Ni, or the like is preferable. Moreover, as the catalyst, a support catalyst using a conductive support body or a non-support catalyst may be used.

In the electrolyte membrane 7, a plurality of through-holes are formed, and in each of the through-holes, an electrolyte material of passing proton ($H^+$) but preventing the fuel from passing therethrough is filled. Such an electrolyte material includes a resin material having a sulfonic acid group such as a perfluorosulfonic acid polymer. Specifically, for example, Nafion (brand name) manufactured by DuPont Corporation and Flemion (brand name) manufactured by Asahi Glass Co., Ltd. are exemplified.

The electrolyte material may be a material having proton conductivity such as an organic material of one kind or more of functional group(s) selected from the group consisting of sulfonic acid group, carboxyl group, and hydroxyl group. Inside the electrolyte material, molecular-size fine holes are formed by these functional groups, and therefore, proton ($H^+$) can move through the fine holes. The sizes of the fine holes are sizes in which protons ($H^+$) and water molecules can pass but methanol molecules cannot pass through the holes.

Moreover, the electrolyte material may be a fluorine-based resin or a hydrocarbon-based resin. In this case, by using a fluorine-based resin, oxidation resistance and chemical resistance can be improved. Furthermore, the electrolyte material may contain an ester group or an ether group in which two kinds or more of a sulfonic acid group, a carboxyl group, and a hydroxyl group are reacted, and may have polytetrafluoroethylene as the main component.

Over a surface of an opposite side in the fuel electrode 6 to the electrolyte membrane 7, a gas diffusion membrane 5, a fuel electrode 4, a temperature distribution-adjusting membrane (a membrane which adjusts a fuel distribution) 15, a porous membrane 3, and a liquid-retaining membrane 2 are laminated in this order.

The gas diffusion membrane plays a role of uniformly supplying a fuel to the fuel electrode 6, and the fuel electrode collector 4 functions as an electric collector. The fuel electric collector 4 is composed of a porous membrane made of a conductive material, for example, composed of a gold foil having a plurality of openings or a mesh of gold.

The fuel distribution-adjusting membrane 15 adjusts an in-plane distribution of the fuel supplied from the side of the liquid-retaining membrane 2 to the side of the fuel electrode 6. The fuel distribution-adjusting membrane 15 can be composed of organic material or inorganic material having heat resistance and resistance to the fuel or complex material thereof.

For example, the organic material includes polyethylene, polypropylene, polyimide, polyamide, polyetherimide, polyetheretherketone, polytetrafluoroethylene, tetrafluoroethylene-ethylene copolymer, tetrafluoroethylene-propylene copolymer, tetrafluoroethylene-hexafluoropropylene copolymer, polyvinylidenefluoride, tetrafluoroethylene-perfluoroalkoxyethylene copolymer, polysulfone, polyphenylenesulfide, polyallylate, polyethersulfone, and polysilazane. The inorganic material includes silicon oxide, silicon carbide, silicon nitride, alumina, zirconium oxide, ceria, lead oxide, bismuth oxide, and boron oxide. The complex material includes polypropylene in which a glass fiber or an organic fiber is complexly mixed.

Moreover, the fuel distribution-adjusting membrane 15 may be provided in the fuel supply side of the membrane electrode assembly 9, and the position of the provision can be appropriately modified. Moreover, the fuel distribution-adjusting membrane 15 may be provided so as to be embedded inside the porous membrane 3, the fuel electrode collector 4, and the gas diffusion membrane 5.

Moreover, the function of the porous membrane 3 and the function of the fuel distribution-adjusting membrane 15, the function of the fuel electrode collector 4 and the function of the fuel distribution-adjusting membrane 15 may be integrated. For example, the adjustment of the fuel supply amount may be performed by changing opening rate of the fuel electrode collector 4 per predetermined region. Moreover, the fuel distribution-adjusting membrane 15 may be provided in a plurality of places.

The porous membrane 3 has hydrophobicity and prevents water from moving from the side of the gas diffusion membrane 5 to the side of the liquid-retaining membrane 2, and on the other hand, enables a gas component of the fuel of transmitting from the side of the liquid-retaining membrane 2 to the side of the gas diffusion membrane. A material of the porous membrane 3 includes polytetrafluoroethylene (PTFE) and water-repellent silicone sheet.

By disposing the porous membrane 3 between the gas diffusion membrane 5 and the liquid-retaining membrane 2, for example, even when water generated in the oxidant electrode 8 is promoted to pass through the electrolyte membrane 7 and to move to the fuel electrode 6, the moving water can be prevented from invading the liquid-retaining membrane 2 and the fuel supply side thereof. Thereby, for example, vaporization of the fuel in a fuel tank, which is not shown, can be made to progress without being blocked. Moreover, by retaining water between the fuel electrode 6 and the porous membrane 3, water can be supplemented to the fuel electrode 6. This is particularly advantageous when moisture is not supplied from a fuel tank, which is not shown, such as when pure methanol is used as the fuel.

The liquid-retaining membrane 2 is a felt-like sheet for supplying the fuel to the fuel electrode 6, and in the side end portion thereof, a supplement part 13 for supplementing the fuel from the fuel tank, which is not shown.

The fuel stored in the fuel tank, which is not shown, can be an aqueous solution of methanol of a concentration of 50 mol % or more or pure methanol.

On the other hand, over the surface in the opposite side in the oxidant electrode 8 to the electrolyte membrane 7, a gas diffusion membrane 10, an oxidant-electrode-side collector 11, and a porous moisture-retaining membrane 12 are laminated in this order.

The gas diffusion membrane 10 plays a role of uniformly supplying an oxidant (oxygen) to the oxidant electrode 8, and the oxidant-electrode-side collector 11 functions as an electric collector in the side of the oxidant electrode 8. The oxidant-electrode-side collector 11 is composed of a porous membrane made of a conductive material for example, composed of a gold foil having a plurality of openings or a mesh of gold.

The porous moisture-retaining membrane 12 is impregnated with some water generated in the air electrode 8 and plays a role of suppressing transpiration of water and also functions as an auxiliary diffusion membrane for promoting uniform diffusion of the oxidant to the air electrode 8 by uniformly introducing an oxidant (air) to the gas diffusion membrane. For the porous moisture-retaining membrane 12, a membrane made of a material such as polyethylene porous membrane whose maximum hole-diameter is, for example, 20-50 micrometers can be used. The reason why the maximum hole-diameter is in this range is that if the hole diameter is smaller than 20 micrometers, the air permeability lowers and that if larger than 50 micrometers, the moisture vaporization becomes excess.

Next, the fuel distribution-adjusting membrane 15 will be explained.

First, necessity of the fuel distribution-adjusting membrane 15 will be explained.

For obtaining a fuel cell of high power density, it is necessary to retain an appropriate supply amount of the fuel to the membrane electrode assembly 9. In this case, if a larger amount of the fuel than the appropriate amount is supplied to the membrane electrode assembly 9, there is danger that unreacted fuel comes to move to the side of the oxidant electrode 8 to reduce the catalyst surface area of the oxidant electrode 8 and therefore the voltage loss increases. By contrast, if the supplied fuel is excessively smaller than the appropriate, there is also danger that the reaction energy becomes too large and the voltage loss increases.

However, it has been revealed that even when the fuel supply amount to the fuel electrode 6 becomes uniform, the power of the fuel cell does not become maximum.

As a result of studies, the present inventors have obtained knowledge that the power density is affected by a temperature distribution in the electromotive portion (the membrane electrode assembly 9 portion) in addition of current density and voltage.

Figure 2:
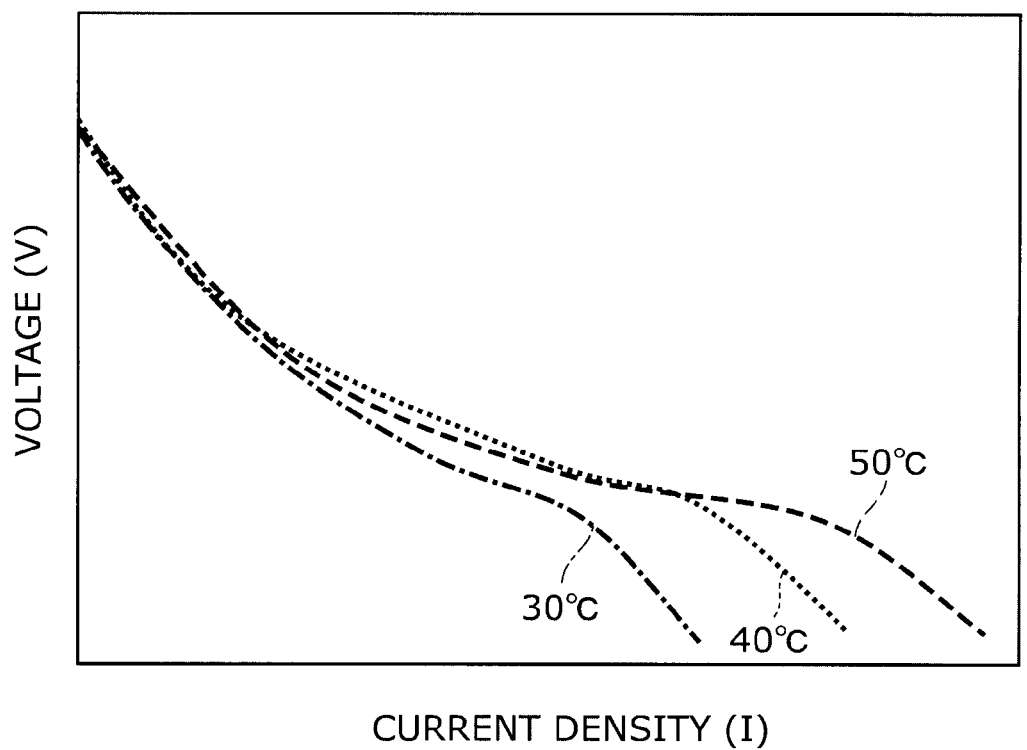
FIG. 2 is a schematic graph view for explaining temperature dependence of voltage.

FIG. 2 is a schematic graph view for explaining temperature dependence of voltage.

As shown in FIG. 2, the voltage V is a function of, the current density I, and temperature T in each of the electromotive portions (the membrane electrode assembly 9 portions), and can be represented by the following equation (1).

$$V = f(I, T) \quad (1)$$

Moreover, the current density I can be represented by the following equation (2) as a function of a concentration a contributing to electric generation in the supplied fuel.

$$I = g(a) \quad (2)$$

Here, the power density w in each of the electromotive portions (the membrane electrode assembly 9 portions) is represented by the product of the equation (1) and the equation (2). Moreover, the power W in the entirety of the electromotive portions (the membrane electrode assembly 9 portions) is the total sum of the power densities w of the respective electromotive portions.

Therefore, for setting the power W in the entirety of the electro motive portions to be maximum, electric generation may be performed in the condition that the W represented by the following equation (3) is maximum.

$$W = \Sigma V \cdot I = \Sigma f(I, T) \cdot I \quad (3)$$

Here, the current density I is a function of the concentration of the fuel, and therefore, can be substantially determined by the kind of the used fuel. Therefore, the power W can be thought to be a function of the temperature T.

On the other hand, in the electromotive portions (the membrane electrode assembly 9 portions), heat is generated by a chemical reaction. However, in the peripheral region, heat release to the outer air occurs, and therefore, temperature rising is smaller than that of the central portion. As a result, even when uniform heat generation occurs in the respective electromotive portions (the respective membrane electrode assembly 9 portions), there is caused nonuniformity of a temperature distribution that the temperature in the central region of the electromotive portions (the membrane electrode assembly 9 portions) is high and the temperature in the peripheral region is low. In such a case, because electric generation efficiencies in the central region and in the peripheral region are different, there is caused a danger that high power cannot be obtained as a whole. That is, for example, even when the temperature in the central region is set to a temperature that is most suitable for electric generation, a temperature in the peripheral region is lower than the temperature, and therefore, the power in the peripheral region lowers, and there is caused a danger that a high power cannot be obtained as the entirety of the fuel cell.

As a result of further studies, the present inventors have obtained knowledge that if a distribution of the fuel supply amount to the electromotive portions (membrane electrode assembly 9 portions) can be adjusted to uniform the temperature distribution in the electromotive portions (membrane electrode assembly 9 portions) and to set the temperature to be a most suitable temperature for electric generation, high power can be obtained as a whole.

Therefore, the fuel distribution-adjusting membrane 15 being capable of such fuel supply to the electromotive portions (membrane electrode assembly 9 portions) as described above is required.

Figure 3:
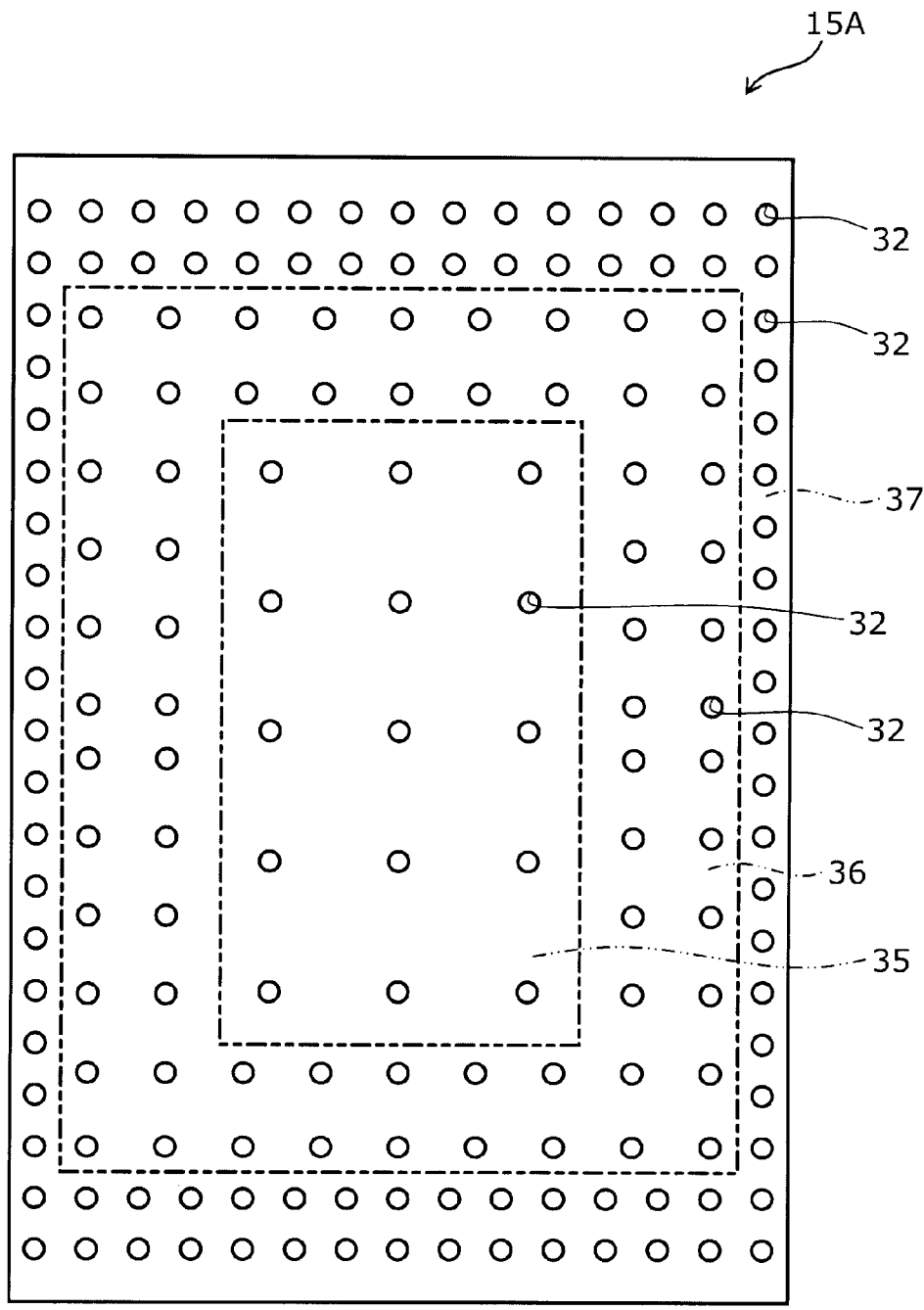
FIG. 3 is a schematic view for exemplifying the case that the opening rate is changed per region.

FIG. 3 is a schematic view for exemplifying the case that the opening rate is changed per region.

As shown in FIG. 3, a fuel distribution-adjusting membrane 15a is a plate-like body having a rectangular shape. Moreover, the shape of the central region 35 is rectangular as viewed from the perpendicular direction to the main surface of the fuel distribution-adjusting membrane 15a, the shape of the intermediate region 36 is rectangular frame-like with surrounding the central region 35, and the shape of the peripheral region 37 is rectangular frame-like with surrounding the intermediate region 36 and containing the edge border of the fuel distribution-adjusting membrane 15a. And, arrangement densities of through-holes 32 among the regions are different, and the density in the central region 35 is the lowest, and the density in the peripheral region 37 is the highest, and the density in the intermediate region is middle. Therefore, the opening rate by the through-holes 32 in the fuel distribution-adjusting membrane 15a is the lowest in the central region 35, the highest in the peripheral region 37, and middle in the intermediate region 36.

For convenience of explanation, the membrane is divided into three regions, but is not limited thereto, and the number of the regions can be appropriately modified. Moreover, the through-holes 32 are set to straight holes but may be formed in a labyrinthine shape. Moreover, the diameter size of the through-hole 32 is not required to be constant in the longitudinal direction, and, for example, a taper shape is possible or the diameter size may be changed per predetermined length. Moreover, sectional shape of the through-hole 32 is not limited to the circular shape, but can be a discretional shape.

When the opening rate is changed per region as described above, the fuel supply amount to the central region 35 becomes the smallest and the heat generation amount in the region becomes the smallest. By contrast, the fuel supply amount to the peripheral region 37 becomes the largest and the heat generation amount in the region becomes the largest. And, the fuel supply amount to the intermediate region 36 and the heat generation amount therein become middle. In this case, the heat release to the outside becomes the smallest in the central region 35 and the largest in the peripheral region. Therefore, by adjusting the balance between the heat generation and the heat release by the fuel supply amount, the temperature in the entire region of the electromotive portions (the membrane electrode assembly 9 portions) can be the most suitable temperature for electric generation.

Figure 4:
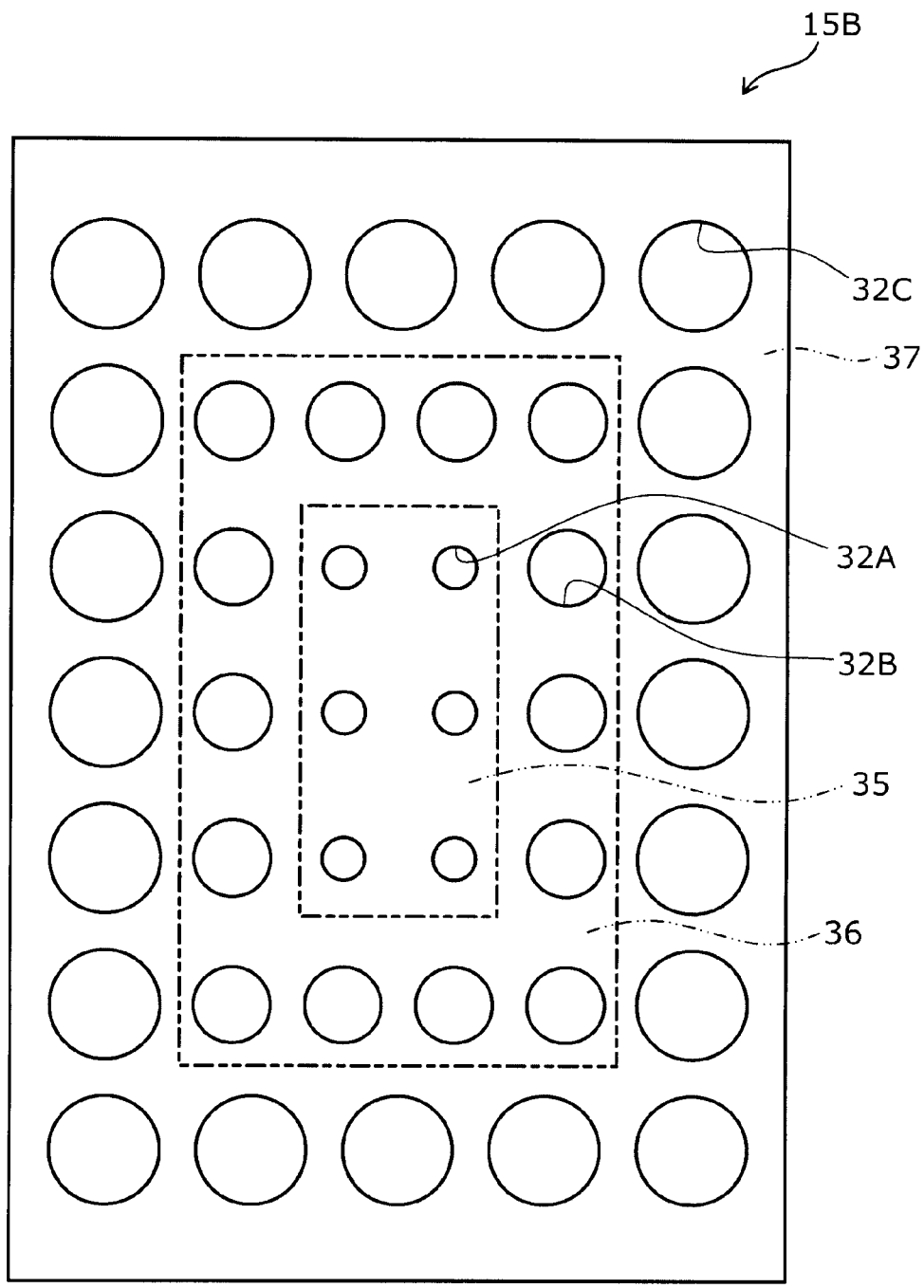
FIG. 4 is a schematic view for exemplifying another specific example for changing the opening rate per region.

FIG. 4 is a schematic view for exemplifying another specific example for changing the opening rate per region.

As shown in FIG. 4, the fuel distribution-adjusting membrane 15b is a plate-like body having a rectangular shape. Moreover, similarly to the above-described fuel distribution-adjusting membrane 15a, the membrane is divided into a rectangular region 35, a rectangular-frame-like intermediate region 36, and a rectangular-frame-like peripheral region 37, the diameters of the through-holes among the respective regions are different. That is, the diameter of the through-holes 32a is smaller than the diameter of the through-holes 32b in the intermediate region 36, and the diameter of the through-holes 32b in the intermediate region 36 is smaller than the diameter of the through-holes 32c in the peripheral region 37. On the other hand, the arrangement densities of through-holes are the same among the respective regions. Therefore, the opening rate by the through-holes of the fuel distribution-adjusting membrane 15b is the lowest in the central region 35, the highest in the peripheral region 37, and middle in the intermediate region 36.

For convenience of explanation, the membrane is divided into three regions but is not limited thereto, and the number of the regions can be appropriately modified. Moreover, the through-holes are set to straight holes but may be formed in a labyrinthine shape. Moreover, the diameter size of the through-hole is not required to be constant in the longitudinal direction, and, for example, a taper shape is possible or the diameter size may be changed per predetermined length. Moreover, sectional shape of the through-hole is not limited to the circular shape, but can be a discretional shape.

When the opening rate is changed per region as described above, the fuel supply amount to the central region 35 becomes the smallest and the heat generation amount in the region becomes the smallest. By contrast, the fuel supply amount to the peripheral region 37 becomes the largest and the heat generation amount in the region becomes the largest. And, the fuel supply amount to the intermediate region 36 and the heat generation amount therein become middle. In this case, the heat release to the outside becomes the smallest in the central region 35 and the largest in the peripheral region 37. Therefore, by adjusting the balance between the heat generation and the heat release by the fuel supply amount, the temperature in the entire region of the electromotive portions (the membrane electrode assembly 9 portions) can be the most suitable temperature for electric generation.

Figure 5:
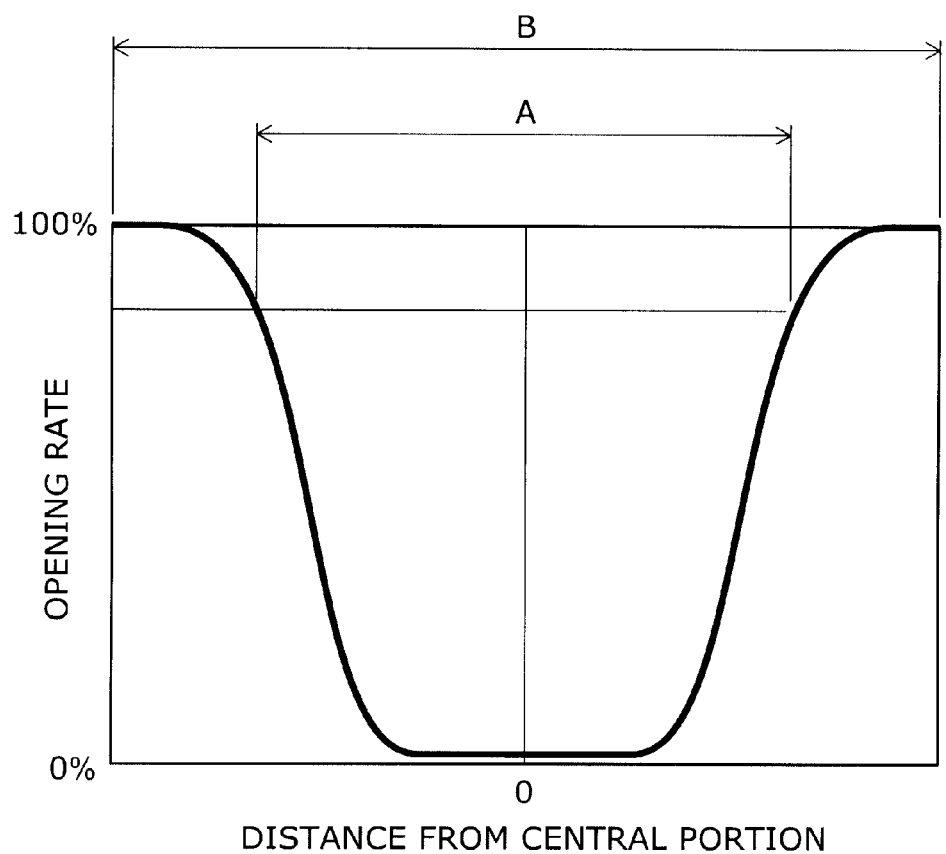
FIG. 5 is a schematic graph for exemplifying the case of changing opening rate per region.

FIG. 5 is a schematic graph for exemplifying the case of changing opening rate per region.

The horizontal axis of FIG. 5 represents distance from the central region of the fuel distribution-adjusting membrane 15, and the vertical axis represents the opening rate.

Here, when the size of the electromotive portions (the membrane electrode assembly 9 portions) (the size of the fuel cell) is changed, the heat release amount to the outside is changed. Therefore, as shown in A and B of the figure, by the distance from the central region of the fuel distribution-adjusting membrane 15, the opening rate is required to be changed. 100% of the opening rate represents the case that the fuel distribution-adjusting membrane 15 does not almost exist.

Figure 6:
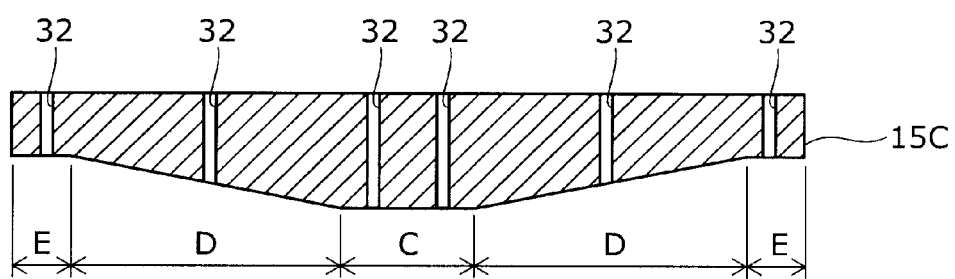
FIG. 6 is a schematic section view for exemplifying the case of changing lengths of the through-holes per region.

FIG. 6 is a schematic section view for exemplifying the case of changing lengths of the through-holes per region.

FIG. 6 is a section view of the fuel distribution-adjusting membrane 15c that is a plate-like body having a rectangular shape.

As shown in FIG. 6, thicknesses of the fuel distribution-adjusting membrane 15c are different among the central region C, the intermediate region D, and the peripheral region E. The thickness in the central region C is the thickest, the thickness in the peripheral region E is the thinnest, and a slope surface is formed in the intermediate region D so as to connect the central region C and the peripheral region E. And, in the respective regions, the through-holes 32 that are substantially perpendicular to the main surface of the fuel distribution adjusting membrane 15c are provided. Thereby, the lengths of the through-holes can be changed per region.

And, as the flow channel length of the through-hole is longer, flow channel resistance increases and the supply amount of the fuel can be decreased. As a result, similarly to the case that the opening rate is changed per region as described above, the fuel supply amount per region can be adjusted.

For convenience of explanation, the membrane is divided into three regions but is not limited thereto, and the number of the regions can be appropriately modified. Moreover, in FIG. 6, the diameter size of the through-hole 32 is set to be the same, but the diameter size may be changed. Moreover, the intermediate region D is set to a linear slope surface, but the slope surface may be formed by a curve and also may be stair-like. Moreover, the through-holes 32 is set to straight holes, but may be formed in a labyrinthine shape. Moreover, the diameter sizes of the through-holes 32 are not required to be constant in the longitudinal direction, and for example, a taper shape is possible or the diameter size may be changed per predetermined length. Moreover, sectional shape of the through-hole is not limited to the circular shape, but can be a discretional shape.

Figure 7:
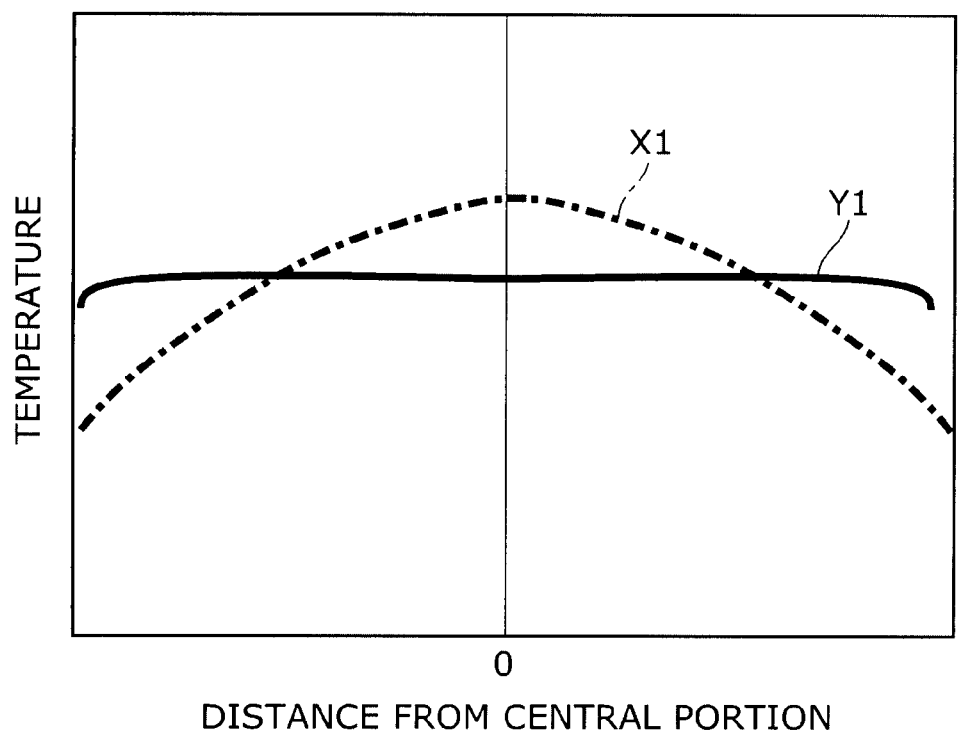
FIG. 7 is a schematic graph for explaining a temperature distribution of the electromotive portions (the membrane electrode assembly portions).

FIG. 7 is a schematic graph for explaining a temperature distribution of the electromotive portions (the membrane electrode assembly 9 portions).

X1 in the figure represents a temperature distribution in the case of uniformly supplying the fuel to the electromotive portions (the membrane electrode assembly 9 portions), and Y1 represents the case of adjusting the fuel supply amount per region by providing the fuel distribution-adjusting membrane 15.

In the case of uniformly supplying the fuel, the heat generation amount becomes almost uniform, but the heat release amount is larger in the more peripheral region, and therefore, the temperature distribution becomes nonuniform. By contrast, when the fuel supply amount per region is adjusted by providing the fuel distribution-adjusting membrane 15 so that the balance between the heat generation amount and the heat release amount is maintained, the temperature distribution can be uniform as shown in Y1 of FIG. 7.

Figure 8:
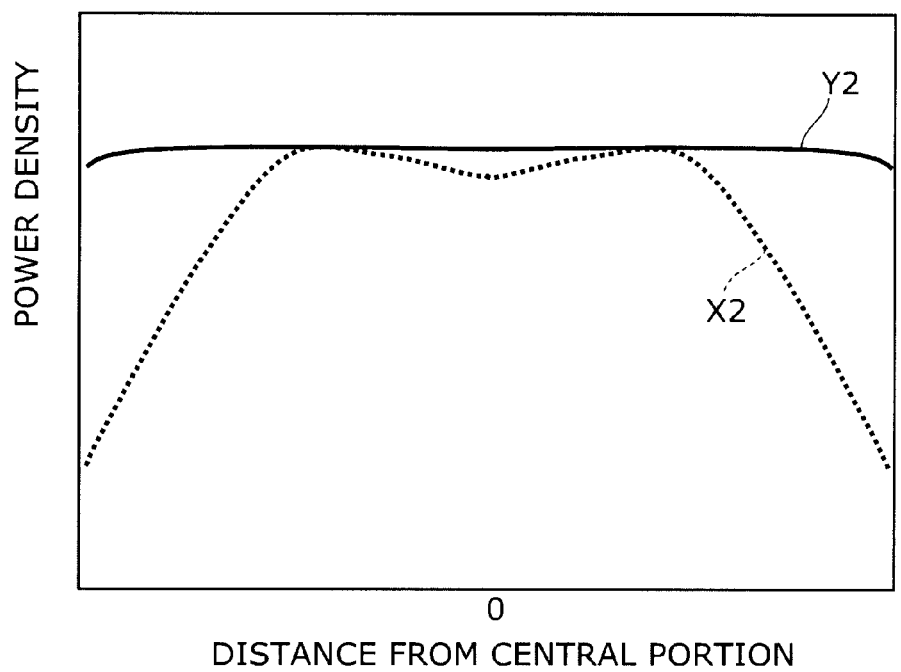
FIG. 8 is a schematic graph for explaining the power density distribution of the electromotive portions (the membrane electrode assembly portions).

FIG. 8 is a schematic graph for explaining the power density distribution of the electromotive portions (the membrane electrode assembly 9 portions).

X2 in the figure represents a temperature distribution in the case of uniformly supplying the fuel to the electromotive portions (the membrane electrode assembly 9 portions), and Y2 represents the case of adjusting the fuel supply amount per region.

In the case of uniformly supplying the fuel, the heat generation amount becomes almost even, but the heat release amount is larger in the more peripheral region, and therefore, the temperature in the peripheral region is lower than that of the central region. Therefore, reaction in the peripheral region does not advance and the power density lowers. Moreover, in the central region, the phenomenon that conversion efficiency to electric energy lowers by the increase of conversion to heat energy appears. Therefore, in the central region, a portion in which the power density lowers appears.

By contrast, when the fuel supply amount per region is adjusted by providing the fuel distribution-adjusting membrane 15 so that the balance between the heat generation amount and the heat release amount is maintained, the temperature distribution can be uniform. And, when the temperature is set to the most suitable temperature for electric generation, the high power density can be obtained in the entire region of the electromotive portions (the membrane electrode assembly 9 portions). In addition, according to the knowledge obtained by the present inventors, the temperature that is the most suitable for electric generation can be appropriately selected in the range of 30° C.-60° C. according to kind or concentration of the fuel, size of the fuel cell, or the like.

Here, according to the simulation result performed by the present inventors, when the fuel supply amount to the peripheral region was 1.6 times more than, the temperature distribution of the electromotive portions (the membrane electrode assembly 9 portions) could be substantially uniform. And, when the power of the fuel cell having such a distribution of fuel supply amount was measured, the power could be 1.5 times more than that of the case of uniformly supplying the fuel.

Next, the action of the fuel cell according to the present embodiment will be explained.

Figure 9:
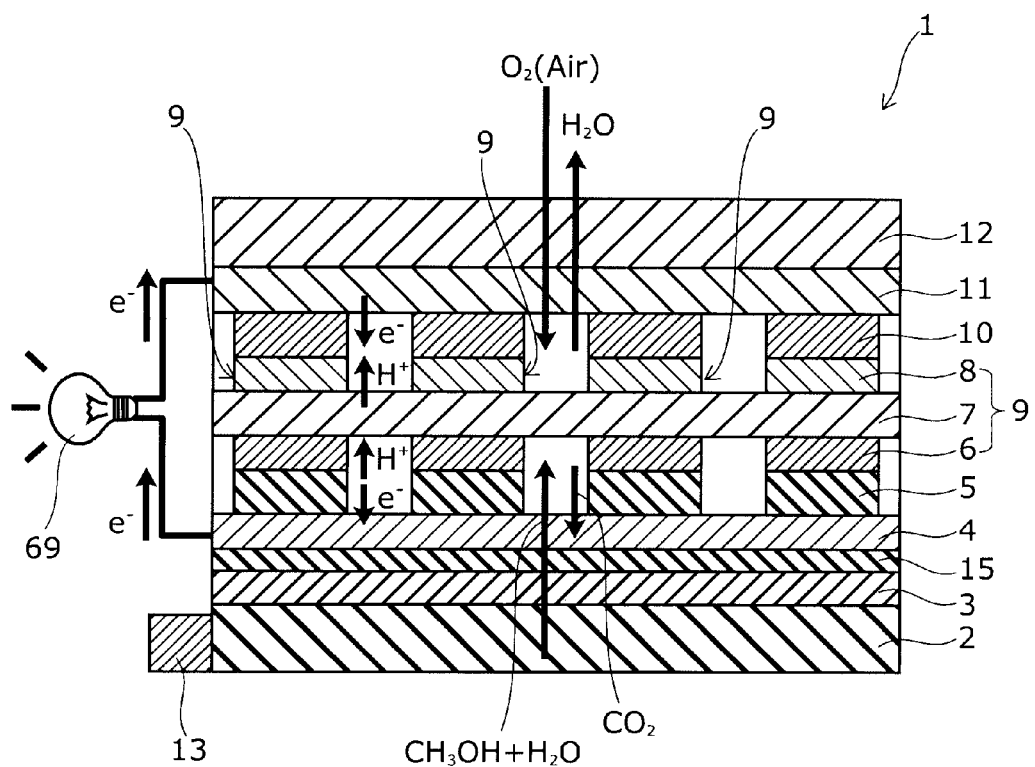
FIG. 9 is a schematic view for explaining the action of the fuel cell.

FIG. 9 is a schematic view for explaining the action of the fuel cell.

The same parts as explained in FIG. 1 are appended with the same reference numerals and the explanation thereof will be omitted.

In the fuel electrode 6 side, when an aqueous solution of methanol, which is the fuel, is supplied, the aqueous solution of methanol generates an oxidation reaction of the following equation (4) by the catalyst of the fuel electrode 6. And, the reaction generates $CO_2$, proton ($H^+$), and electron ($e^-$). In this case, the action of the fuel distribution-adjusting membrane 15 adjusts the fuel supply amount to the respective electromotive portions (the respective membrane electrode assembly 9 portions).

The proton ($H^+$) permeates the electrolyte membrane 7 and moves to the oxidant electrode 8 side. The electron ($e^-$) goes through a load 69 to perform work, and then, moves to the oxidant electrode 8 side.

$$CH_3OH + H_2O \rightarrow CO_2 \; 3O \; 6H^+ + 6e^- \quad (4)$$

The proton ($H^+$) reaching the oxidant electrode 8 side and the electron ($e^-$) reaching the oxidant electrode 8 side react with oxygen in the air by the catalyst in the oxidant electrode 8 to generate a reductive reaction of the equation (5).

$$6H^+ + 6e^- + (3/2)O_2 \rightarrow 3H_2O \quad (5)$$

The carbon dioxide ($CO_2$) generated in the fuel electrode 6 side is exhausted to the outside from a fuel exhaust duct, which is not shown, with the residual aqueous solution of methanol. Moreover, water generated in the oxidant electrode 8 side is exhausted from an air hole, which is not shown, as moisture vapor.

By these reactions, reaction heat is generated, but heat release to the outer air occurs in the peripheral region, and therefore, the temperature rising becomes smaller than that of the central region. As a result, even when uniform heat generation occurs in the respective electromotive portions (the respective membrane electrode assembly 9 portions), there is caused nonuniformity of the temperature distribution that the temperature in the central region becomes high and the temperature in the peripheral region becomes low. In such a case, because electric generation efficiencies of the central region and the peripheral region are different, there is danger that high power cannot be obtained as a whole.

In this embodiment, because the fuel distribution-adjusting membrane 15 is provided, and therefore, by adjusting the fuel supply amount to the respective electromotive portions (the respective membrane electrode assembly 9 portions), the temperature in the entire region of the electromotive portions (the membrane electrode assembly 9 portions) can be the most suitable temperature for electric generation. As a result, the fuel cell having high power can be obtained.

Next, a method of producing a fuel cell 1 according to this embodiment will be explained.

Figure 10:
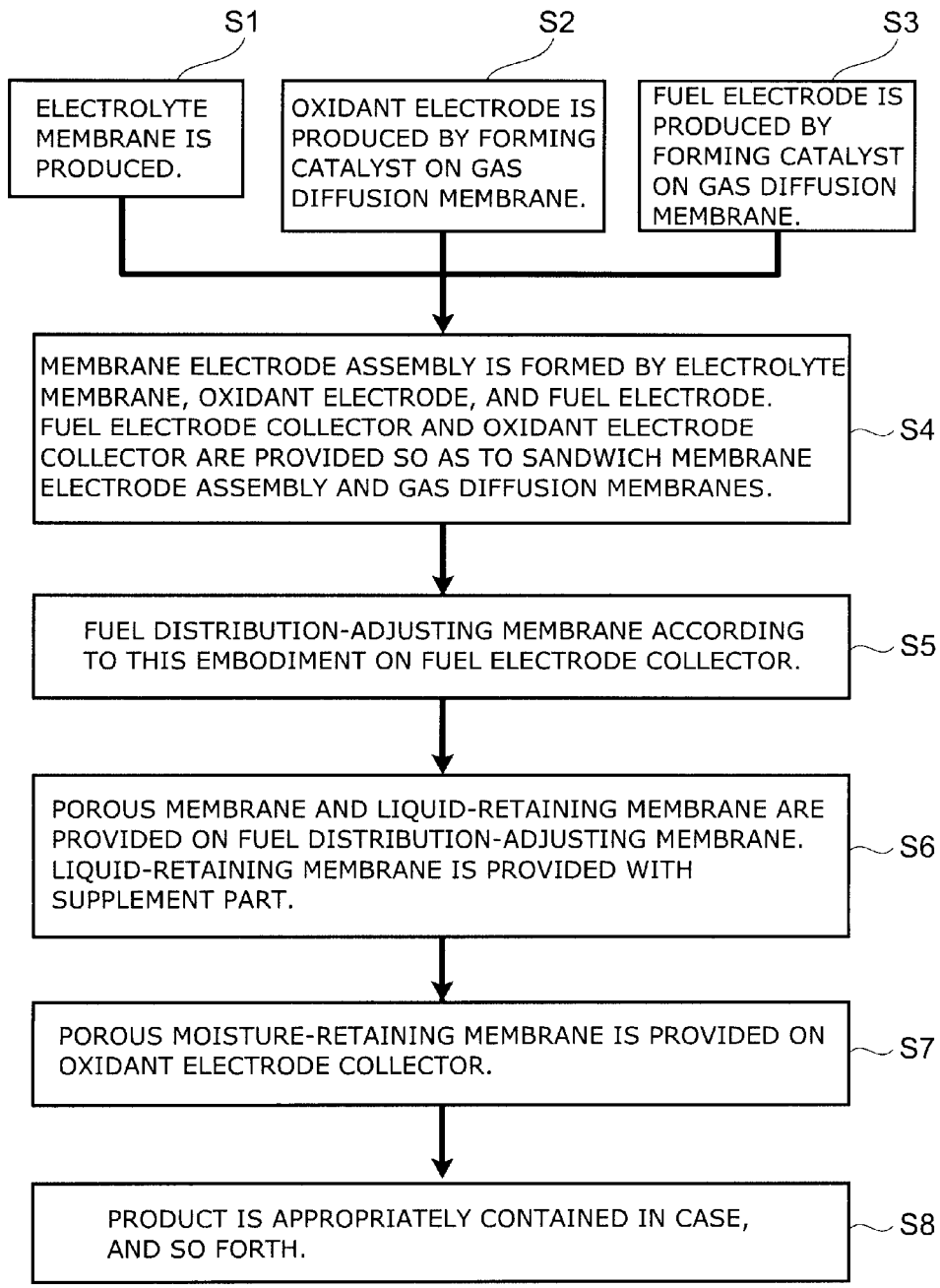
FIG. 10 is a flow chart for explaining the method of producing the fuel cell according to an s embodiment of the invention.

FIG. 10 is a flow chart for explaining the method of producing the fuel cell according to this embodiment.

First, a porous material layer is produced by using chemical or physical methods such as phase separation method, foaming method, and sol-gel method of the porous material layer, commercially available porous material may be appropriately used. For example, polyimide porous membrane (UBILEX PT manufactured by UBE INDUSTRIES, LTD) with a thickness of 25 micrometers and an opening rate of 25% and so forth can be used.

And, an electrolyte is filled in the porous material layer to produce the electrolyte membrane 7 (Step S1). A method of filling the electrolyte includes a method of immersing the porous material layer in an electrolyte solution and pulling out and drying the layer to remove the solvent. The electrolyte solution includes Nafion (registered trademark, manufactured by DuPont Corporation). The electrolyte membrane 7 may be a membrane made of a polyelectrolyte material. In this case, production of the porous membrane layer and filling of the electrolyte are not required.

Next, the gas diffusion membrane 10 is produced by impregnating PTFE (Polytetrafluoroethylene) solution into a carbon fabric cloth with porous property or a carbon paper. And, platinum (Pt) fine particles, granular or fibrous carbon such as active carbon or graphite, and a solvent are mixed to be a paste, and the paste is applied and dried at a normal temperature, and thereby, a catalyst is formed to produce the oxidant electrode 8 (Step S2).

On the other hand, the gas diffusion membrane 5 is produced by impregnating PTFE (Polytetrafluoroethylene) solution into a carbon fabric cloth with porous property or a carbon paper. And, fine particles of platinum (Pt)-ruthenium (Ru), granular or fibrous carbon such as active carbon or graphite, and a solvent are mixed to be a paste, and the paste is applied and dried at a normal temperature, and thereby, a catalyst is formed to produce the fuel electrode 6 (Step S3).

Next, the membrane electrode assembly 9 is formed by the electrolyte membrane 7, the oxidant electrode 8, and the fuel electrode 6. And, the fuel electrode collector 4 and the oxidant electrode collector 11 that are each composed of a gold foil having a plurality of openings for taking in air or vaporizing methanol are provided so as to sandwich the gas diffusion membranes 5, 10 (Step S4).

Next, a fuel distribution-adjusting membrane 15 according to this embodiment is provided on the fuel electrode collector 4 (Step 5).

The fuel distribution-adjusting membrane 15 is produced by providing openings in a base composed of organic material or inorganic material having heat resistance and resistance to the fuel or complex material thereof. As a method of providing the openings, a dry etching method or a wet etching method or the like can be used. Here, there is exemplified the case in which the membrane to be the base is made of inorganic material and the openings are provided by using a wet etching method. First, an ultraviolet-curable resin is spin-coated at substantially some tens of micrometers on the membrane made of inorganic material, and a pattern of the openings are formed through baking, exposure, development, and post-backing. Then, etching is performed with buffered hydrofluoric acid and the resist is removed by using a remover solution, and thereby, desired openings can be provided in the membrane. Also, in the case of changing the thickness direction of the membrane as explained in FIG. 6, the openings can be produced by using a dry etching method or a wet etching method.

For example, by changing the opening rate of the fuel electrode collector 4 per predetermined region, the collector can be made to have the function of the fuel distribution-adjusting membrane 15, together. In this case, it can be thought that the fuel electrode collector 4 and the fuel distribution-adjusting membrane 15 are integrated.

Next, the porous membrane 3 and the liquid-retaining membrane 2 are provided on the fuel distribution-adjusting membrane 15 in this order, and the liquid-retaining membrane 2 is provided with the supplement part 13 (Step S6). A fuel tank, which is not shown, is connected to the supplement part 13.

Next, the porous moisture-retaining membrane 12 made of a porous material is provided on the oxidant electrode collector 11 (Step S7).

Last, the product is appropriately contained in a case, and so forth to form the fuel cell 10 (Step S8).

As described above, embodiments of this invention has been explained with reference to specific examples. However, this invention is not limited thereto.

As long as having the characteristics of the present invention, the above-described specific example subjected appropriately to design change by those skilled in the art is included in the scope of the present invention.

For example, shape, size, material, disposition, and so forth of each component of the above-described fuel cell are not limited to the exemplified things but can be appropriately modified.

Also, the fuel cell composed of a single membrane electrode assembly is illustrated, but a stuck structure in which a plurality of the membrane electrode assemblies are laminated is possible.

Moreover, the fuel cell provided with a plurality of the electromotive portions (the membrane electrode assembly portions) is illustrated, but the fuel cell provided with the simple electromotive portion (the membrane electrode assembly portion) is possible.

Also, as the fuel, methanol aqueous solution is exemplified, but the fuel is not limited thereto. The other fuel includes an alcohol such as ethanol and propanol as well as methanol, an ether such as dimethylether, a cycloparaffin such as cyclohexane, a cycloparaffin having a hydrophobic group such as hydroxyl group, carboxyl group, amino group, or amide group. Such a fuel is generally used as an aqueous solution of substantially 5-90% by weight.

Moreover, the components which the above-described respective specific examples have can be combined if at all possible, and the example having combination thereof is included in the scope of the present invention as long as containing the characteristic of the present invention.

The invention claimed is:

1. A membrane which adjusts a fuel distribution,
the membrane being provided in a fuel supply side of a membrane electrode assembly of a fuel cell,
the membrane electrode assembly including an anode electrode, a cathode electrode, and an electrolyte membrane provided between the anode electrode and the cathode electrode,
the membrane having a plurality of through-holes through which fuel passes,
a major surface of the membrane having a central region including a central portion of the membrane, an intermediate region surrounding the central region, and a peripheral region surrounding the intermediate region,
the central region having through-holes, the intermediate region having through-holes and the peripheral region having through-holes,
an array of the through-holes in the intermediate region surrounding an array of the through-holes of the central region, and an array of the through-holes of the peripheral region surrounding the array of the through-holes of the intermediate region,
the central region, the intermediate region and the peripheral region are concentric,
the through-holes in the central region having an opening rate lower than an opening rate of the through-holes in the intermediate region,
the opening rate of the through-holes in the intermediate region being lower than and opening rate of the through-holes in the peripheral region, and
the opening rates of the through-holes of the central region, the intermediate region and the peripheral region changing concentrically.

2. The membrane which adjusts a fuel distribution according to claim 1, wherein the openings are provided so that heat generation amount in a central region of the membrane becomes smaller than that in a peripheral region of the membrane.

3. The membrane which adjusts a fuel distribution according to claim 1, wherein size of the openings in a central region of the membrane is smaller than that in a peripheral region of the membrane.

4. The membrane which adjusts a fuel distribution according to claim 1, wherein flow channel length of the openings of a central region in the membrane is greater than that in a peripheral region of the membrane.

5. A fuel cell comprising:
a membrane electrode assembly including an anode electrode, a cathode electrode, and an electrolyte membrane provided between the anode electrode and the cathode electrode; and a membrane which adjusts a fuel distribution, which is provided in a fuel supply side of the membrane electrode assembly, the membrane having a plurality of through-holes through which fuel passes, a major surface of the membrane having a central region including a central portion of the membrane, an intermediate region surrounding the central region, and a peripheral region surrounding the intermediate region, the central region having through-holes, the intermediate region having through-holes and the peripheral region having through-holes, an array of the through-holes in the intermediate region surrounding an array of the through-holes of the central region, and an array of the through-holes of the peripheral region surrounding the array of the through-holes of the intermediate region, the central region, the intermediate region and the peripheral region are concentric, the through-holes in the central region having an opening rate lower than an opening rate of the through-holes in the intermediate region, the opening rate of the through-holes in the intermediate region being lower than and opening rate of the through-holes in the peripheral region, and the opening rates of the through-holes of the central region, the intermediate region and the peripheral region changing concentrically.

* * * * *